US008742282B2

(12) United States Patent
Asokan et al.

(10) Patent No.: US 8,742,282 B2
(45) Date of Patent: Jun. 3, 2014

(54) ABLATIVE PLASMA GUN

(75) Inventors: Thangavelu Asokan, Karnataka (IN); Gopichand Bopparaju, Karnataka (IN); Adnan Kutubuddin Bohori, Karnataka (IN)

(73) Assignee: General Electric Company, Niskayuna, NY (US)

(*) Notice: Subject to any disclaimer, the term of this patent is extended or adjusted under 35 U.S.C. 154(b) by 1894 days.

(21) Appl. No.: 11/735,673

(22) Filed: Apr. 16, 2007

(65) Prior Publication Data

US 2008/0253040 A1 Oct. 16, 2008

(51) Int. Cl.

*B23K 9/00* (2006.01)
*H02H 3/00* (2006.01)
*H01J 17/26* (2012.01)

(52) U.S. Cl.

USPC .................. 219/121.36; 219/74; 219/121.39; 219/121.47; 219/121.48; 219/121.52; 361/2; 361/56; 361/120; 313/231.31; 313/231.41

(58) Field of Classification Search

USPC ........ 361/2, 56, 120; 219/74, 121.36, 121.39, 219/121.47, 121.48, 121.5, 121.52, 121.57, 219/121.58–121.59; 327/304; 315/111.21, 315/150, 156, 36; 313/231.31, 552; 60/203.1

See application file for complete search history.

(56) References Cited

U.S. PATENT DOCUMENTS 1,803,175 A * 4/1931 Devers .......................... 313/572
3,977,191 A * 8/1976 Britt ................................ 60/509
4,259,704 A * 3/1981 Hamann .......................... 361/16
4,493,297 A 1/1985 McIlwain et al.
4,902,870 A 2/1990 Frind et al.
5,120,567 A 6/1992 Frind et al.
5,225,656 A 7/1993 Frind
5,233,155 A 8/1993 Frind
5,924,278 A * 7/1999 Burton et al. ................ 60/203.1
6,001,426 A * 12/1999 Witherspoon et al. ........ 427/449
6,141,192 A 10/2000 Garzon (Continued)

FOREIGN PATENT DOCUMENTS

EP 1976077 A2 10/2008
WO 0178470 A1 10/2001

OTHER PUBLICATIONS

Editor: Jim Wilson; NASA Official: Brian Dunbar; Title: Pulsed Plasma Thrusters; From NASA fact sheets (available on Internet); Last updated Mar. 17, 2006.

(Continued)

*Primary Examiner* — Dana Ross
*Assistant Examiner* — Ket D Dang
(74) *Attorney, Agent, or Firm* — Jason K. Klindtworth

(57) ABSTRACT

A plasma gun with two gap electrodes on opposite ends of a chamber of ablative material such as an ablative polymer. The gun ejects an ablative plasma at supersonic speed. A divergent nozzle spreads the plasma jet to fill a gap between electrodes of a main arc device, such as an arc crowbar or a high voltage power switch. The plasma triggers the main arc device by lowering the impedance of the main arc gap via the ablative plasma to provide a conductive path between the main electrodes. This provides faster triggering and requires less trigger energy than previous arc triggers. It also provides a more conductive initial main arc than previously possible. The initial properties of the main arc are controllable by the plasma properties, which are in turn controllable by design parameters of the ablative plasma gun.

18 Claims, 3 Drawing Sheets

(56) References Cited

U.S. PATENT DOCUMENTS

| | | | | |
|---|---|---|---|---|
| 6,207,916 | B1 | 3/2001 | Pniok et al. | |
| 6,242,707 | B1 | 6/2001 | Mody et al. | |
| 6,417,671 | B1 | 7/2002 | Tiemann | |
| 6,532,140 | B1 | 3/2003 | McMahon et al. | |
| 6,633,009 | B1 | 10/2003 | Shea | |
| 6,683,764 | B1 | 1/2004 | Pniok | |
| 6,740,841 | B2 * | 5/2004 | Brunet et al. | 219/121.52 |
| 6,751,528 | B1 | 6/2004 | Dougherty | |
| 6,839,209 | B2 | 1/2005 | Shea et al. | |

OTHER PUBLICATIONS

Publication Titled: Bypass Gap, by GE Transmission, Distribution & Industrial Systems, regarding Series Compensation Systems, dated Nov. 14, 1999.

Search Report and Written Opinion from corresponding EP Application No. 08154225.0-1226 dated May 11, 2012.

* cited by examiner

ABLATIVE PLASMA GUN

BACKGROUND

The present invention generally relates to plasma guns, particularly to ablative plasma guns, and also relates to triggers for electric arc devices.

Electric arc devices are used in a variety of applications, including series capacitor protection as described in U.S. Pat. No. 4,259,704 of the present assignee, high power switches, acoustic generators, shock wave generators, and pulsed plasma thrusters. Such devices have two or more electrodes separated by a gap of air or another gas. A bias voltage is applied to the electrodes across the gap. A triggering device in the gap ionizes a portion of the gas in the gap, providing a conductive path that initiates arcing between the electrodes.

Conventional spark gap triggering involves application of high voltage pulses to a trigger pin. The trigger pulse magnitude depends largely on the bias voltage across the spark gap. Although such pulse triggering is widely used, the cost of the trigger source and its electronics is several times higher than the cost of the main spark gap itself. For example, in a 600V system the required trigger voltage is at least 250 KV for a gap of 20 mm.

BRIEF DESCRIPTION OF THE INVENTION

An aspect of the invention resides in a plasma gun with two gap electrodes in diagonally opposite ends of an open-ended chamber of ablative material such as an ablative polymer. A divergent nozzle ejects and spreads an ablative plasma at supersonic speed.

Another aspect of the invention resides in using the ablative plasma to trigger a main arc device, such as an arc crowbar or a high power switch, faster and with less trigger energy than existing triggers.

Another aspect of the invention resides in controlling the initial properties of a triggered arc in a main arc device via properties of an ablative plasma, which are in turn controllable by design parameters of an ablative plasma gun.

Another aspect of the invention resides in reducing cost for triggering arc devices by means of inexpensive ablative plasma gun designs and by the reduced triggering energy and related trigger circuit requirements.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
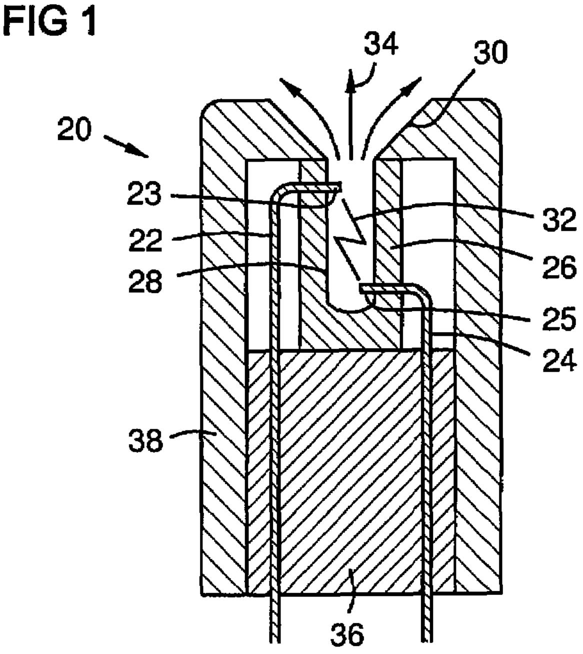
FIG. 1 is a sectional view of an ablative plasma gun according to aspects of the invention.

FIG. 1 is a sectional view of a plasma gun 20 with first and second electrodes 22, 24, a cup of ablative material 26 and a divergent nozzle 30. A pulse of electrical potential applied between the electrodes 22, 24 creates an arc 32 that heats and ablates some of the cup material 26 to create a highly conductive plasma 34 at high pressure. The plasma exits the nozzle 30 in a spreading pattern at supersonic speed.

Characteristics of the plasma jet 34 such as velocity, ion concentration, and spread, may be controlled by the electrode dimensions and separation, the dimensions of the interior chamber 28 of the cup 26, the type of ablative material, the trigger pulse shape and energy, and the nozzle shape. The cup material may be Polytetrafluoroethylene, Polyoxymethylene Polyamide, Poly-methyle methacralate (PMMA), other ablative polymers, or various mixtures of these materials. The chamber 28 may be generally elongated and cylindrical with a closed end, to minimize trigger pulse energy, ablation response time, and ejection time, and maximize plasma production, or it may be another shape.

The plasma gun may have a base 36 for supporting the electrodes 22, 24 and the cup 26 as shown. A cover 38 may enclose the other elements and provide the nozzle 30. The cup 26 may be retained between the base 36 and the cover 38 as shown. The base 36 and the cover 38 may be made of the same material as the cup or of different materials, such as a refractory or ceramic material. Each electrode 22, 24 has a respective distal end 23, 25 that enters the chamber 28 through the cup 26 walls. The electrodes 22, 24 may be formed as wires as shown to minimize expense, or they may have other known forms. The distal ends of the electrodes 23, 25 may be diagonally opposed across the chamber 28 and separated along the length of the chamber 28 as shown to provide a gap for the gun arc 32. The material of the electrodes, or at least the distal ends of the electrodes, may be tungsten steel, tungsten, other high temperature refractory metals/alloys, carbon/graphite, or other suitable arc electrode materials.

Figure 2:
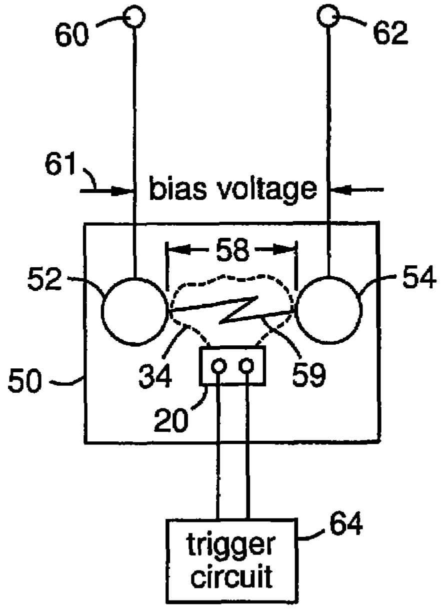
FIG. 2 is a general circuit diagram of an ablative plasma gun used to trigger an electric arc device.

The inventors have innovatively recognized that an ablative plasma gun embodying aspects of the present invention provides a more efficient arc gap trigger than conventional triggering methods mentioned above. FIG. 2 is a general schematic diagram of an ablative plasma gun 20 that may be used as a trigger in a main gap 58 of a main arc device 50. In the context of the foregoing sentence, the term "main" is used to distinguish elements of a larger arc-based device from corresponding elements of the present plasma gun (e.g., used as a trigger), since the plasma gun also constitutes an arc-based device. The main arc device may be for example an arc crowbar, a series capacitor protective bypass, a high power switch, an acoustic generator, a shock wave generator, a pulsed plasma thruster, or other known arc devices.

For readers desirous of general background information in connection with an example main arc device, reference is made to U.S. patent application Ser. No. 11/693,849, filed Mar. 30, 2007 by the assignee of the present invention, titled "Arc Flash Elimination Apparatus And Method", and herein incorporated by reference in its entirety. This application describes an innovative arc crowbar that may be triggered by an ablative plasma gun embodying aspects of the present invention. The arc crowbar has two or more main electrodes separated by a gap of air or another gas in a pressure-tolerant case. Each electrode is connected to an electrically different portion of a power circuit. An ablative plasma gun is mounted in the gap. When an arc flash is detected on the power circuit, the arc crowbar is triggered by a voltage or current pulse to the plasma gun. The gun injects ablative plasma into the crowbar gap, reducing the gap impedance sufficiently to initiate a protective arc between the main electrodes that quickly absorbs energy from the arc flash and opens a circuit breaker. This quickly stops the arc flash and protects the power circuit.

Generally, a main arc device 50 has two or more main electrodes 52, 54 separated by a gap 58 of air or another gas. Each electrode 52, 54 is connected to an electrically different portion 60, 62 of a circuit, for example different phases, neutral, or ground. This provides a bias voltage 61 across the arc gap 58. A trigger circuit 64 provides a trigger pulse to the ablative plasma gun 20, causing it to eject ablative plasma 34 into the gap 58, lowering the gap impedance to initiate an arc 59 between the electrodes 52, 54.

Figure 3:
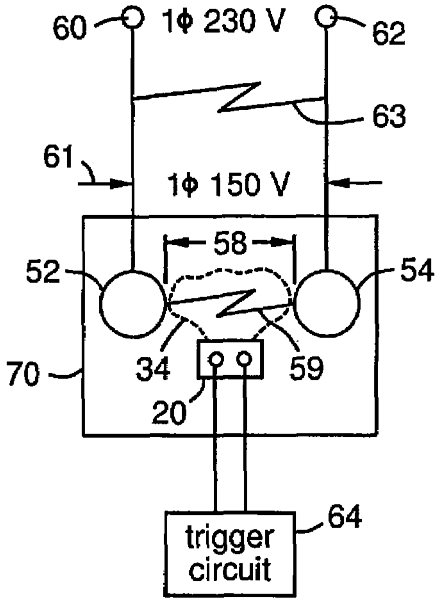
FIG. 3 is an exemplary circuit diagram of an ablative plasma gun trigger of an electric arc device.

FIG. 3 shows an example of a circuit used in testing an arc crowbar 70. An arc flash 63 on the circuit 60, 62 is shown reducing the bias voltage 61 available across the gap 58. The impedance of the main electrode gap 58 may be designed for a given voltage by the size and spacing of the main electrodes 52, 54, so as not to allow arcing until triggering. Characteristics of the plasma 34 may be determined by the spacing of the gun electrodes 22, 24, the ablative chamber 28 dimensions, the trigger pulse shape and energy, the material of the chamber 28, and the dimensions and placement of the nozzle 30. Thus the impedance of the main gap 58 upon triggering can be designed to produce a relatively fast and robust main arc.

Figure 4:
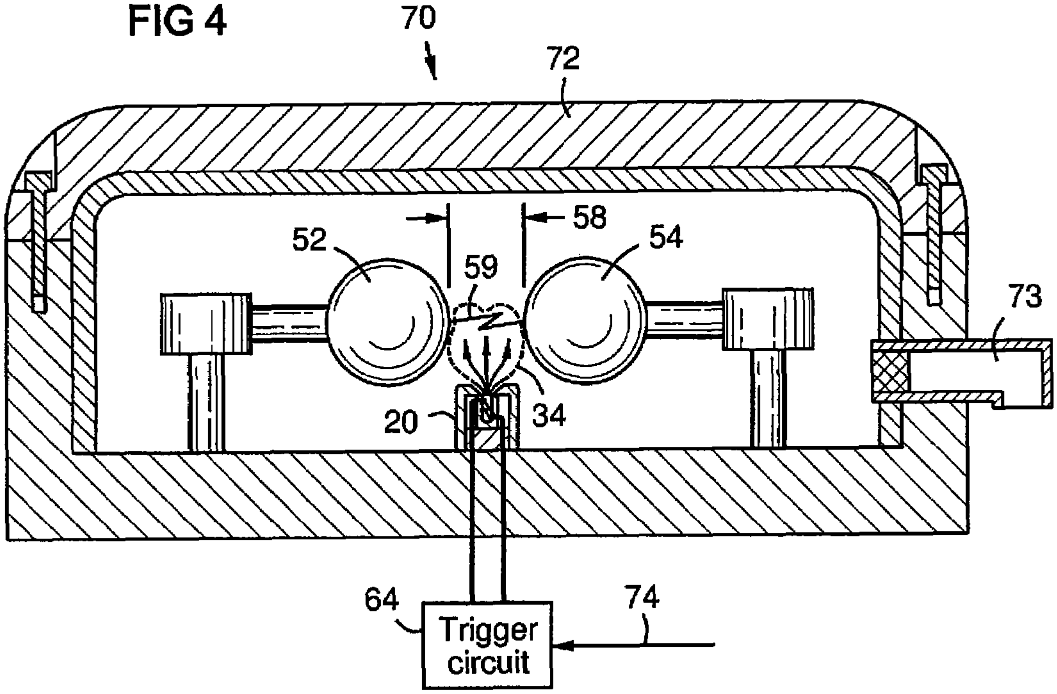
FIG. 4 is a sectional view of an ablative plasma gun triggering an arc crowbar.
Figure 5:
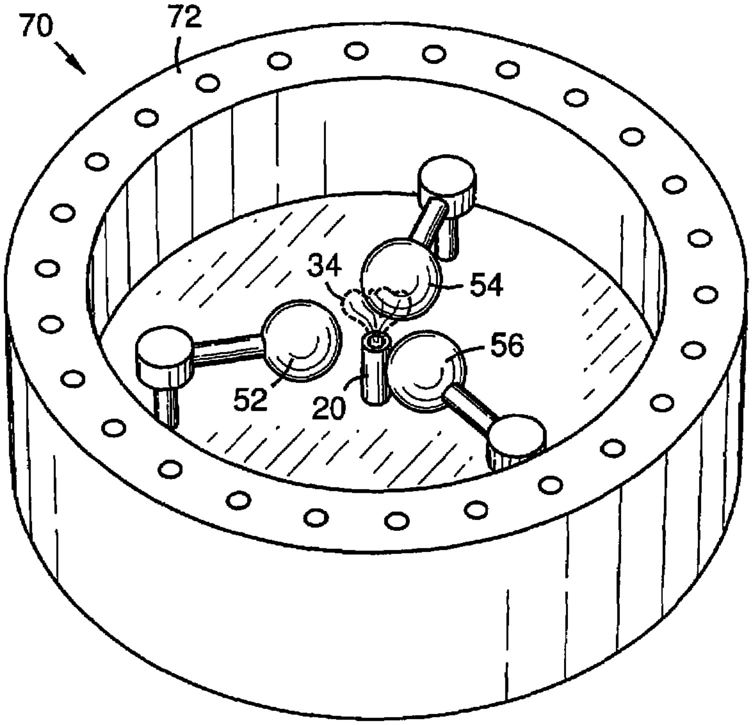
FIG. 5 is a perspective view of an ablative plasma gun triggering an arc crowbar.

FIGS. 4 and 5 show the ablative plasma gun 20 as may be configured in one example embodiment to trigger an arc crowbar 70 in a pressure-tolerant case 72, as described in the foregoing patent application. Upon receiving a trigger signal 74, the trigger circuit 64 sends a trigger pulse to the ablative plasma gun 20, causing it to inject an ablative plasma 34 into the gap 58 between main electrodes 52, 54, 56 of the crowbar to initiate a protective arc 59. The case 72 may be constructed to be tolerant of explosive pressure caused by the protective arc, and may include vents 73 for controlled pressure release.

The arc crowbar electrode gap 58 should be triggered as soon as an arc flash is detected on a protected circuit. One or more suitable sensors may be arranged to detect an arc flash and provide the trigger signal 74 as detailed in the related patent application. In the case of a 600V system, during arc flash the voltage across the gap 58 is normally less than 250 volts, which may not be enough to initiate the arc 59. The ablative plasma 34 bridges the gap 58 in less than about a millisecond to enable a protective short circuit via the arc 59 to extinguish the arc flash before damage is done.

In a series of successful tests of an arc crowbar 70, the crowbar electrodes 52, 54, 56 were about 40 mm diameter spheres, each spaced about 25 mm from the adjacent sphere, with sphere centers located at a radius of about 37.52 mm from a common center point. The trigger was an ablative plasma gun 20 with a cup 26 made of Polyoxymethylene with a chamber 28 diameter of about 3 mm and chamber length of about 8 mm. The nozzle 30 was located about 25 mm below the plane of the electrode 53, 54, 46 sphere centers.

Gap bias voltages ranging from about 120V to about 600V were triggered in testing by the ablative plasma gun using a triggering pulse 8/20 (e.g., a pulse with a rise time of about 8 microseconds and a fall time of about 20 microseconds) with respective current and voltage ranges from about 20 kA to about 5 kA and from about 40 kV to about 5 kV. For example, a gap bias voltage of about 150V was triggered by a trigger pulse of about 20 kV/5 kA. In contrast, a conventional trigger pin would require a trigger pulse of about 250 kV for this same bias voltage, making the conventional trigger pin and its circuitry several times more expensive than the main electrodes.

Figure 6:
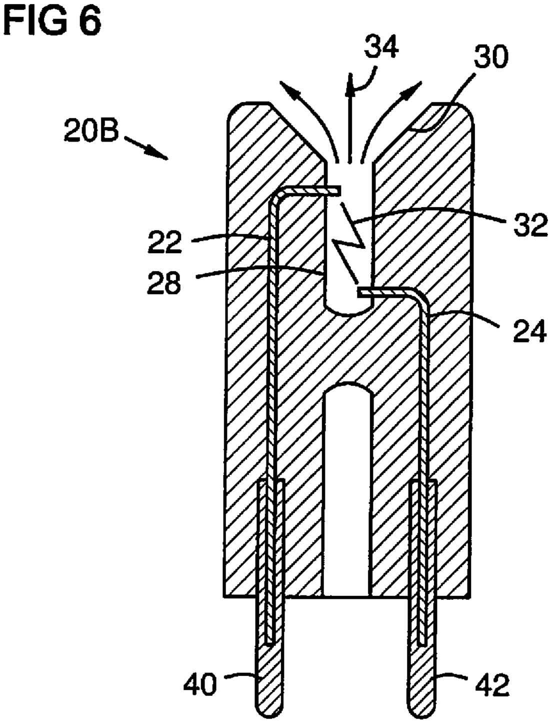
FIG. 6 shows an embodiment of an ablative plasma gun molded of a single material in a single mold.

FIG. 6 shows an embodiment 20B of the plasma gun molded of a single ablative material in a single mold. This would provide an incremental cost reduction in production in view of the relatively low cost and favorable molding properties of polymers such as Poly-oxymethylene. Such construction and low cost can make the plasma gun easily replaceable and disposable. Electrode lead pins 40, 42 may be provided for quick connection of the plasma gun to a female connector (not shown) on the main arc device, with appropriate locking and polarity keying as known in connector arts. Alternately (not shown), the cup 26 of FIG. 1 can be made replaceable by providing it with lead pins for a female connector in the base 36, and threading the cover 38 onto the base 36.

It will be appreciated that an ablative plasma gun embodying aspects of the present invention may be used as both a main arc device, and as a trigger. For example, an ablative plasma gun may be provided as a main arc device in an acoustic generator, a shock wave generator, or a pulsed plasma thruster, and may be triggered by a smaller ablative plasma gun as described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An ablative plasma gun comprising:

a cup of ablative material forming a generally cylindrical chamber with, an open end and a closed end;

a first gun electrode having a distal end extending through the cup proximate the open end of the chamber;

a second gun electrode having a distal end extending through the cup proximate the closed end of the chamber and diagonally opposite the first gun electrode; and a cover enclosing at least a portion of the cup and forming a divergent nozzle for the open end of the chamber.

2. The ablative plasma gun of claim 1, wherein each of the first and second gun electrodes comprises a wire.

3. The ablative plasma gun of claim 1, wherein the cup and the cover are made of a single piece of ablative material.

4. The ablative plasma gun of claim 1, further comprising a base, wherein an intermediate portion of each gun electrode passes through the base, the cover is mounted on the base, and the cup is mounted between the base and the cover.

5. The ablative plasma gun of claim 1, further comprising a main arc device having two or more main electrodes, wherein the chamber is configured to inject an ablative plasma into a main gap between the two or more main electrodes to trigger an arc between the main electrodes, wherein each of the main electrodes is connected to an electrically different portion of an electric circuit.

6. The ablative plasma gun of claim 5, wherein the main arc device is selected from the group consisting of an arc crowbar, a series capacitor protective bypass, a high power switch, an acoustic generator, a shock wave generator, and a pulsed plasma thruster.

7. The ablative plasma gun of claim 5, wherein the main arc device is a second ablative plasma gun used as an acoustic generator or a shock wave generator or a pulsed plasma thruster.

8. The ablative plasma gun of claim 5, wherein the ablative plasma is designed to lower the electrical impedance of the main gap below the electrical impedance of any other gaps or other insulation separating the electrically different portions on the electrical circuit.

9. The ablative plasma gun of claim 1, mounted to inject and spread an ablative plasma into a gap between main electrodes of an arc crowbar upon receiving a triggering signal.

10. The ablative plasma gun of claim 1, wherein substantially the whole ablative plasma gun is made of an ablative polymer except for the gun electrodes and leads thereto.

11. The ablative plasma gun of claim 10, wherein the ablative polymer is selected from the group consisting of Polyoxymethylene, Polytetrafluoroethylene, Polyamide, and Poly-methyl-methacralate (PMMA).

12. The ablative plasma gun of claim 1, wherein the ablative material is configured to produce, upon ablation, a highly conductive plasma so as to be spread by the divergent nozzle and reduce a gap impedance between the first and second gun electrodes.

13. The ablative plasma gun of claim 1, further comprising a base for supporting the first and second gun electrodes and the cup, wherein the cup is retained between the base and the cover.

14. An apparatus comprising:

a protective arc device comprising main electrodes separated by a main gap in a gas in a pressure-tolerant case, each main electrode connected to an electrically different portion of an electrical circuit;

an ablative plasma gun mounted in the protective arc device to inject an ablative plasma into the main gap, thus initiating a protective arc between the main electrodes that absorbs energy from the electrical circuit; and a trigger circuit that sends an electrical pulse to activate the ablative plasma gun, wherein the ablative plasma gun comprises a chamber with an open end, a closed end, and walls made of an ablative material, two gun electrodes extending through the walls into diagonally opposite ends of the chamber, one gun electrode proximate the closed end and the other gun electrode proximate the open end, and a cover forming a divergent nozzle for the open end of the chamber.

15. The apparatus of claim 14, wherein the ablative plasma is designed to lower the electrical impedance of the main gap below the electrical impedance of any other gaps or other insulation separating the electrically different portions on the electrical circuit.

16. The apparatus of claim 13, wherein substantially an entire ablative plasma gun is made of an ablative polymer except for the gun electrodes and leads thereto.

17. The apparatus of claim 16, wherein the ablative polymer is selected from the group consisting of Polyoxymethylene, Polytetrafluoroethylene, Polyamide, and Poly-methyl-methacralate (PMMA).

18. The apparatus of claim 13, wherein the electrical pulse comprises a pulse width in the order of microseconds and is formed by a current in a range from about 5 kA to about 20 kA and a voltage range from about 5 kV to about 40 kV.

* * * * *